Aug. 20, 1957     D. U. McCABE     2,803,424
SECTIONAL CHECK VALVE HOUSING WITH CLAMPING MEANS
Filed Aug. 14, 1953.     2 Sheets-Sheet 1

Daniel U. McCabe
INVENTOR.

BY *Clarence A. O'Brien*
*and Harvey B. Jacobson*
Attorneys

Aug. 20, 1957 D. U. McCABE 2,803,424
SECTIONAL CHECK VALVE HOUSING WITH CLAMPING MEANS
Filed Aug. 14, 1953 2 Sheets-Sheet 2

Daniel U. McCabe
INVENTOR.

United States Patent Office 2,803,424
Patented Aug. 20, 1957

2,803,424

SECTIONAL CHECK VALVE HOUSING WITH CLAMPING MEANS

Daniel U. McCabe, Shawnee, Okla.

Application August 14, 1953, Serial No. 374,277

1 Claim. (Cl. 251—145)

This invention relates generally to valve mechanisms and pertains more particularly to an improved form of check valve assemblies.

A primary object of this invention is to provide an improved form of check valve assemblies which is particularly adapted for use in conjunction with buried or generally inaccessible pipeline, the valve being so constructed as to be readily accessible for repair and replacement.

Another object of this invention is to provide an improved check valve in conformity with the foregoing objects which incorporates a valve body adapted for introduction into an existing pipeline or piping system and a removable cage and valve assembly.

Still another object of this invention is to provide an improved form of check valve assembly wherein the body member is separable for removal of one portion thereof, facilitating repair and replacement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 5:
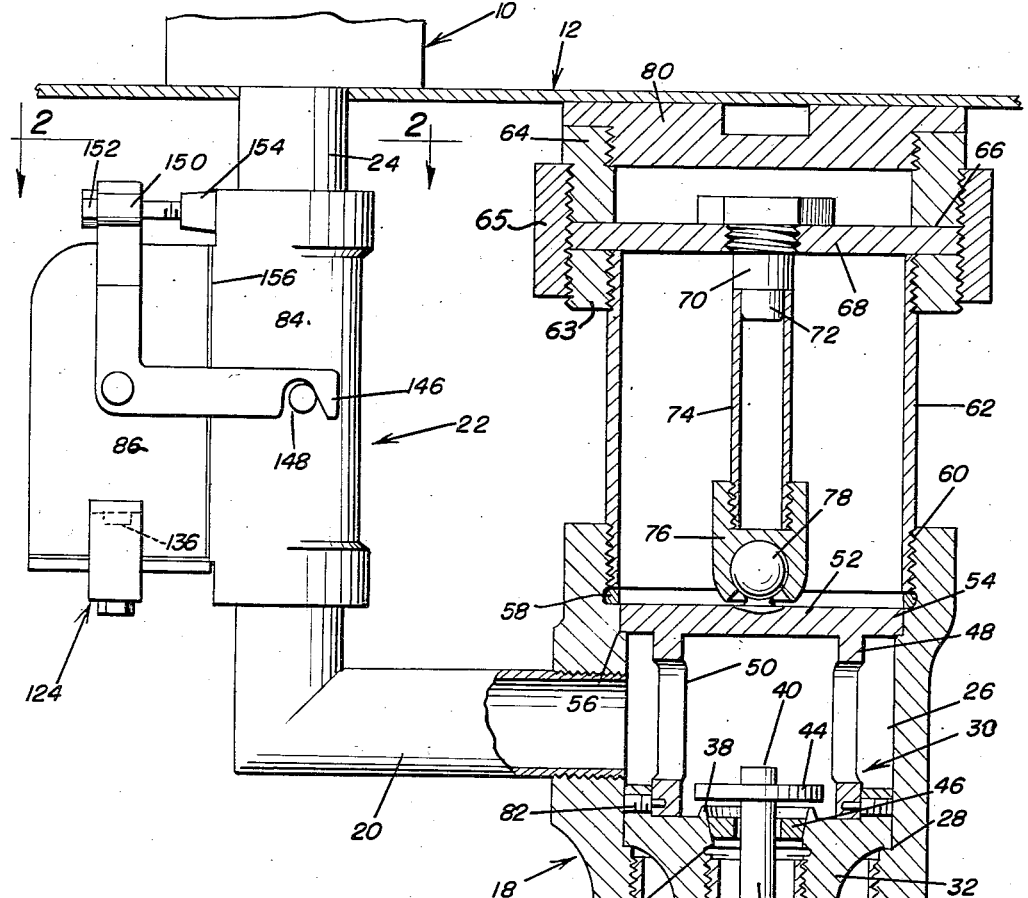
Figure 1 is an elevational view partly in section showing a system of piping utilizing valves constructed in accordance with the invention.
Figure 5 is a perspective view of clamping or securing means utilized in the construction shown in Figures 2 and 3.

Referring now more particularly to Figure 1, reference numeral 10 indicates generally the bottom portion of a pump assembly which is suitably mounted on a platform or island 12 which may be formed in any conventional manner of such materials as concrete, steel, or the like, the same forming no part of this invention. Below the platform 12 and the surface of the ground, the usual storage tank is located (not shown) which includes an internally threaded boss 14 by means of which access may be had into the interior thereof.

In installations of the general construction above described, it is necessary to provide at least one check valve in the piping or pipeline between the reservoir tank and the pump in order that the latter may be prepared for instant delivery, as is well recognized in the art. Such installations are commonly found in gasoline stations, in oil and other liquid dispensing establishments and works, or in many installations wherein it is desired to pump a fluid from an underground storage tank. Installing conventional check valve assemblies in such systems, it is necessary to entirely remove the pump to gain access to the check valve units in order to remove them for repair and replacement. The hereinafter described invention obviates the necessity for removing the pump and permits a portion of the valve assembly to be removed for repair or replacement.

As seen in Figure 1, a standard nipple 16 is threaded into the boss 14 in the reservoir tank and the upper end of this nipple receives the valve body indicated generally by the reference character 18, the nipple threading into the inlet opening thereof. The valve body 18 is also provided with an outlet opening to which the elbow 20 is connected which connects to a second check valve assembly 22 allowing flow of fluid through the line 24 to the pump 10.

With reference now more particularly to the assembly designated by the reference character 18, it will be seen that the body has a hollow interior providing the chamber 26 which is restricted adjacent the inlet opening thereof to provide a shoulder or step 28 upon which the lower end of the cage assembly indicated generally by the reference character 30 is adapted to seat. The cage includes the lower boss member 32 provided with an axial bore 34 which is internally threaded at one side to receive the standpipe 36 which projects into the reservoir tank and below the level of liquid therein adjacent its bottom, thereby providing a supply line to the check valve assembly. The upper surface of the boss is provided with a seat projection 38 surrounding the bore 34 upon which the valve member 40 is adapted to engage. This valve includes an elongated stem 42 and a head 44 in the form of an annular flange which engages upon the upper surface of the seat 38, the inwardly directed flange 46 being provided in the boss member 32 surrounding the stem 42 and assuring proper seating of the head 44 on the valve seat 38. Of course, the operation of the valve is such that when the pump 10 is in operation the pressure on the downstream side of the valve head 44 will be reduced to lift the valve member off of its associated seat and permit the fluid within the tank to flow upwardly to the pump, the valve seating by gravity upon its seat when the pump is shut off.

The cylindrical upright wall 48 of the cage is provided with outlet slots 50 and the upper end of the cage is closed by means of the end wall 52 which includes the radial flange portion 54 presenting an enlarged head at the upper end of the cake which is adapted to engage on the seat 56 provided in the body 18, the gasket 58 being disposed therebetween so that the boss 32 may properly seat on its associated shoulder 28, without extremely accurate machining of the associated parts. The upper end of the body 18 is provided with an internally threaded aperture 60 in concentric vertical alignment with both the seat or shoulder portions 28 and 58 and this aperture receives a length of pipe 62 of any suitable length which has a collar member 63 threadedly engaged on its upper end. A bar 68 overlies the upper end of pipe 62 within sleeve 65 and is maintained in place by ring 64, the bar being provided with a threaded aperture through which the cap screw member 70 projects. The member 70 is provided with a reduced lower end portion 72 disposed within a pressure member 74 imparting a downward force on the cage and boss assemblies through the medium of the socket member 76 engaging a ball 78 formed on the upper surface of the enlarged head of the cage. In this manner, when the cap screw 70 is tight, the cage and boss member will be properly engaged upon their associated seat or shoulders 28 and 58. The cover member or cap 80 is provided to prevent any leakage which might otherwise occur.

When it is desired to remove the cake and boss assemblies, it is merely necessary to remove the cap and ring member 80 and 64 whereupon the entire assembly may be lifted bodily out of the body 18 as will be readily apparent. In this respect, it will be noted that the upper surface of the boss 32 is recessed to receive the lower end of the cage assembly 30 and that suitable set screw members 82 are provided for securing these members together, while at the same time permitting them to be dismantled for removal or replacement of the valve member 40.

Figure 3:
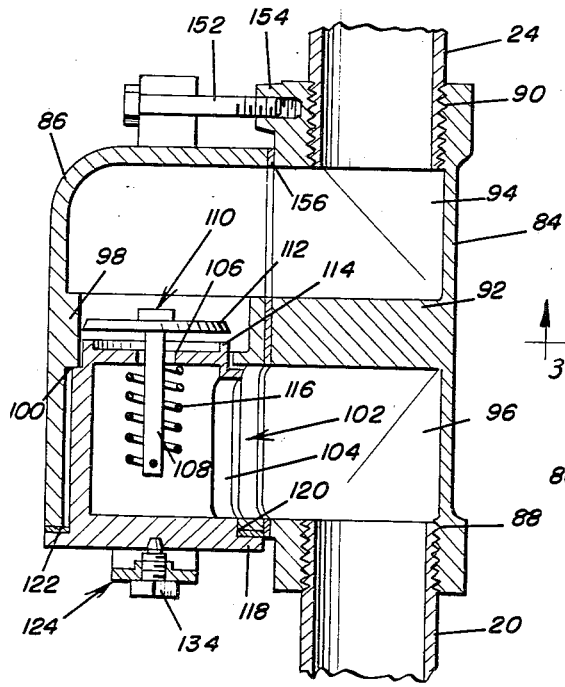
Figure 3 is a vertical section taken substantially along the plane of section line 3—3 in Figure 2 showing details of internal construction of the one form of valve construction.

Referring now more particularly to Figure 3 wherein the details of the check valve assembly 22 is shown, it will be noted that the body of this valve is divided into two sections 84 and 86, the section 84 being provided at lower and upper ends thereof respectively with the internally threaded openings 88 and 90 for receiving the pipeline 20 and 24. This section is partitioned by the wall member 92 subdividing the interior of this section into upper and lower recesses 94 and 96 respectively which extend laterally and are open at one side of this section, as shown. The second section 86 is substantially hollow and is provided with upper and lower openings communicating with the upper and lower recesses of the first section with the reduced or restricted flange portion 98 being in register with the partitioned wall 92 of the first section and presenting a shoulder 100 upon which the upper end of the cage assembly indicated generally by the reference character 102 is adapted to seat. This cage assembly is provided with side wall opening 104 communicating with the lower recess 96 and with an aperture 106 at its upper end completing the communication between the upper and lower recesses of the first section.

The stem 108 of the valve member 110 projects through the opening 106 and its head 112 is adapted to seat upon the annular seat portion 114 formed on the upper surface of the cage in the manner shown with the spring 116 connected at one end of the extreme free end of the stem 108 and abutting against the undersurface of the cage to normally engage the valve with the cage seat 114. Thus, it will be seen, that the liquid from the reservoir tank is permitted to flow to the pump 10 but is not permitted to flow back into the tank when the pump is shut off. The lower end of the cage assembly 102 is provided with an enlarged head 118 which projects through and overlies the lower portion of the valve body section 86 surrounding its lower opening 120, the resilient gasket 122 being disposed between the section 86 and the head 118 to allow proper seating between the cage and the shoulder 100 of the valve body.

As seen most clearly in Figure 5, a U-shaped clamping bracket member 124 is provided with inwardly directed ears 126 at the free ends of its legs 128 and its bight portion 130 is provided with a threaded aperture 132 to receive the pressure screw 134 as seen most clearly in Figure 3. The valve body section 86 is provided at opposite sides with lugs 136 over which the ears 126 are engaged and the pressure screw 134 is tightened against the lower face of the valve gage assembly 102 to force this assembly into engagement with the valve body section 86, as will be readily apparent. By this construction, it will be manifest that the entire cage assembly is readily removed from the section 86 by merely removing the clamping assembly 124.

Opposite sides of the section 86 are also provided with oppositely directed pin members 138 which are received in the apertures 140 provided at an intermediate portion of the crank members 142, these clamp members being disposed at opposite sides of this valve body section. The horizontal leg portion 144 of these cranks are provided with the cam notches 146 which are adapted to engage over the pin member 148 which are secured at opposite sides to the valve body section 84. The upper ends of the crank assemblies 142 are mutually convergent and are provided with the arcuated portions 150 which receive the clamping screw 152 therebetween which is threaded into an apertured boss 154 in the valve body section 84 so that as the screw 152 is threaded into the boss, the cam notches 146 will coact with the pin 148 to draw the section 86 toward the section 84 so that the resilient gasket 156 therebetween will be compressed to urge the two sections into sealing engagement with one another.

Figure 2:
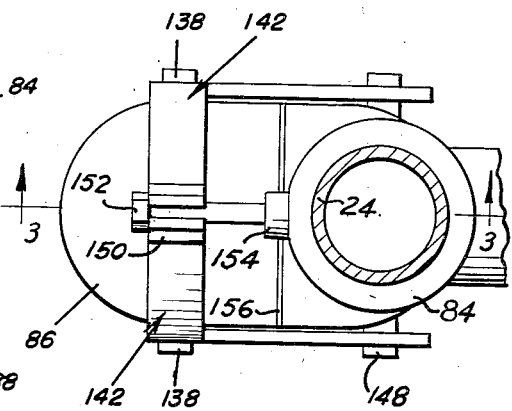
Figure 2 is a horizontal section taken substantially along the plane of section line 2—2 showing external details of construction of one form of valve assembly.

By the construction of the assembly shown in Figures 2 and 3, it will be apparent that the valve mechanism may be easily removed for repair or replacement by merely providing a suitable opening in the island or platform 12 which will permit the latching or clamping screw 152 to be manipulated so as to allow the section 86 to be separated from the section 84 for removal and subsequent repair or replacement.

Figure 6:
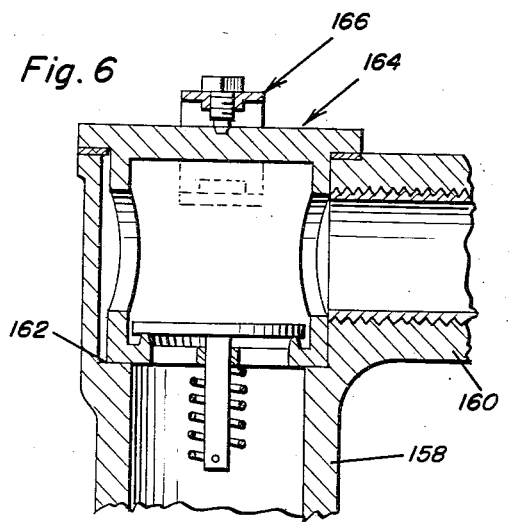
Figure 6 is a section taken through a modified form of valve assembly.
Figure 4:
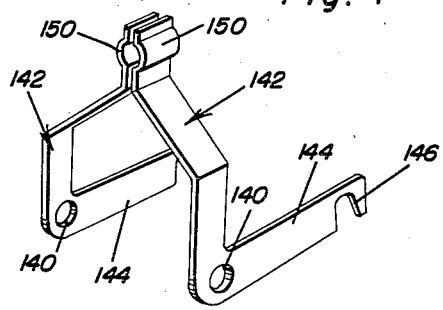
Figure 4 is a perspective view of one of the clamping or locking members utilized in conjunction with the assembly shown in Figures 2 and 3.

Referring now more particularly to Figure 6, the modified valve body shown incorporates a lower vertical leg portion 158 and an upper horizontal leg portion 160 to which the inlet and outlet lines respectively of the system are connected. The shoulder 162 is provided within the body and the cage assembly 164 is adapted to seat at its lower end therein, this cage assembly being identical in construction to the previously described cage assembly 102 and being urged into engagement with the valve body by means of the clamping assembly 166 which is also identical in construction to the previously described assembly 124. The assembly in Figure 6 may, of course, be substituted for the assembly shown in Figures 2 and 3.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A check valve assembly comprising a hollow body having inlet and outlet openings, said body having a restricted portion defining a shoulder, a valve cage having an end seating upon said shoulder, said cage having an aperture, a seat surrounding said aperture, a valve member adapted to cooperate with said seat to control flow therethrough, said valve member being urged to a seated position and responsive to an increase in upstream fluid pressure to move to an open position, said body having an opening in concentric alignment with said shoulder through which said cage and valve member may be withdrawn from the body, clamping structure urging said cage into engagement with said shoulder, said body being divided into a first and a second section, the first section including said inlet and outlet openings and having separate recesses communicating therewith, said second section containing said valve cage and valve member and having lateral openings establishing flow communication between the recesses of said first section through said valve cage and valve member, means urging said first and second sections into sealed engagement, said urging means comprising a generally U-shaped clamping member having legs provided with laterally offset parts at the outer ends thereof, the outer ends of said legs being pivotally secured to said second section and said laterally offset parts straddling said first section, pins carried by said second section, cam notches in said laterally offset parts receiving said pins, and means secured to said first section and engaging said clamping member for swinging said clamping member about its pivotal connection with said second section.

(References on following page)

References Cited in the file of this patent

UNITED STATES PATENTS

| | | |
|---|---|---|
| 829,316 | Ball | Aug. 21, 1906 |
| 1,041,237 | Budlong | Oct. 15, 1912 |
| 1,187,553 | Riordan | June 20, 1916 |
| 1,277,463 | Norton | Sept. 3, 1918 |
| 1,653,613 | Bast | Dec. 27, 1927 |
| 1,675,082 | Aular | June 26, 1928 |
| 2,297,942 | Collins | Oct. 6, 1942 |

FOREIGN PATENTS

| | | |
|---|---|---|
| 358,381 | France | of 1905 |
| 705,230 | Germany | of 1941 |